United States Patent [19]
Franz et al.

[11] Patent Number: 5,707,412
[45] Date of Patent: Jan. 13, 1998

[54] METHOD OF REDUCING GLASS SHEET MARKING

[75] Inventors: Helmut Franz, Pittsburgh; Fred A. Fortunato, Allison Park, both of Pa.

[73] Assignee: PPG Industries, Inc., Pittsburgh, Pa.

[21] Appl. No.: 415,810

[22] Filed: Apr. 3, 1995

Related U.S. Application Data

[63] Continuation-in-part of Ser. No. 316,163, Sep. 30, 1994, abandoned.

[51] Int. Cl.⁶ .......................... C03B 35/00; C03B 40/02
[52] U.S. Cl. .................. 65/24; 65/25.1; 65/25.2; 65/26; 65/60.1; 65/60.5; 65/60.51; 65/60.53; 65/60.7; 427/133; 427/168; 427/193; 427/255; 427/255.1; 427/421
[58] Field of Search .............. 65/24, 25.1, 25.2, 65/26, 60.1, 60.5, 60.51, 60.53, 60.7, 111; 427/168, 193, 133, 255, 255.1, 421

[56] References Cited

U.S. PATENT DOCUMENTS

| | | | |
|---|---|---|---|
| 3,329,490 | 7/1967 | Jendrisak | 65/26 |
| 3,442,748 | 5/1969 | D'huart | 161/1 |
| 3,519,408 | 7/1970 | Russell | 65/24 |
| 3,791,809 | 2/1974 | Lau | 65/30 |
| 3,844,754 | 10/1974 | Grubb | 65/30 |
| 3,877,919 | 4/1975 | Shorr | 65/194 |
| 4,273,832 | 6/1981 | Hogan | 428/410 |
| 4,344,986 | 8/1982 | Henery | 427/180 |
| 4,671,814 | 6/1987 | Aratani et al. | 65/30.14 |
| 4,725,452 | 2/1988 | Hargreaves | 427/160 |
| 4,753,191 | 6/1988 | Henery | 118/308 |

OTHER PUBLICATIONS

*Industrial Spray Products*, Catalog 55, by Spraying Systems Co. (1993).

*Primary Examiner*—Nasser Ahmad
*Attorney, Agent, or Firm*—Andrew C. Siminerio

[57] ABSTRACT

The present invention discloses a method of reducing marking of a heat softened glass sheet which results when portions of the sheet are contacted by glass sheet handling equipment. The portions of the sheet susceptible to marking are sprayed with an inert material having a melting point and decomposition temperature of at least 1200° F. to form a layer that protects the sheet portion against marking from the equipment. In one particular embodiment of the invention, the lower major surface of a glass sheet is sprayed with an aqueous solution of sodium sulfate to form a layer of sodium sulfate along the glass surface which protect against marking of the glass by conveyor rolls.

17 Claims, 3 Drawing Sheets

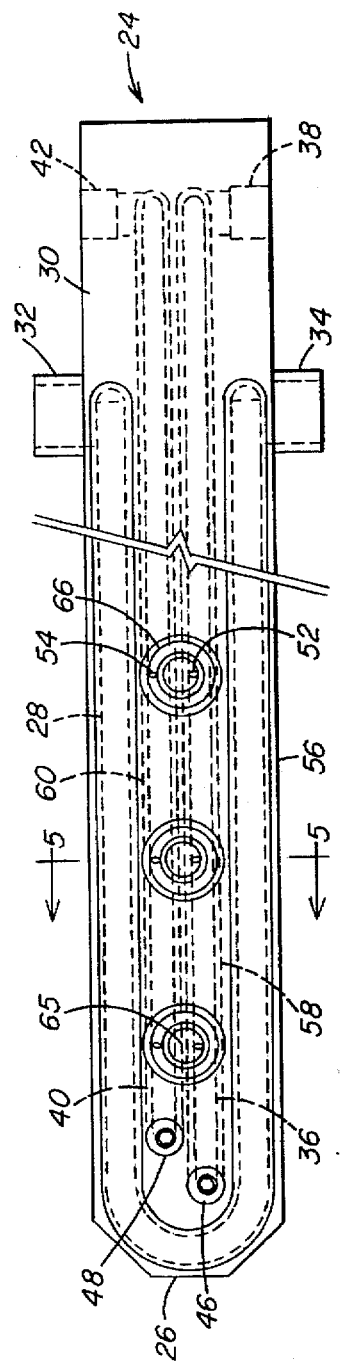
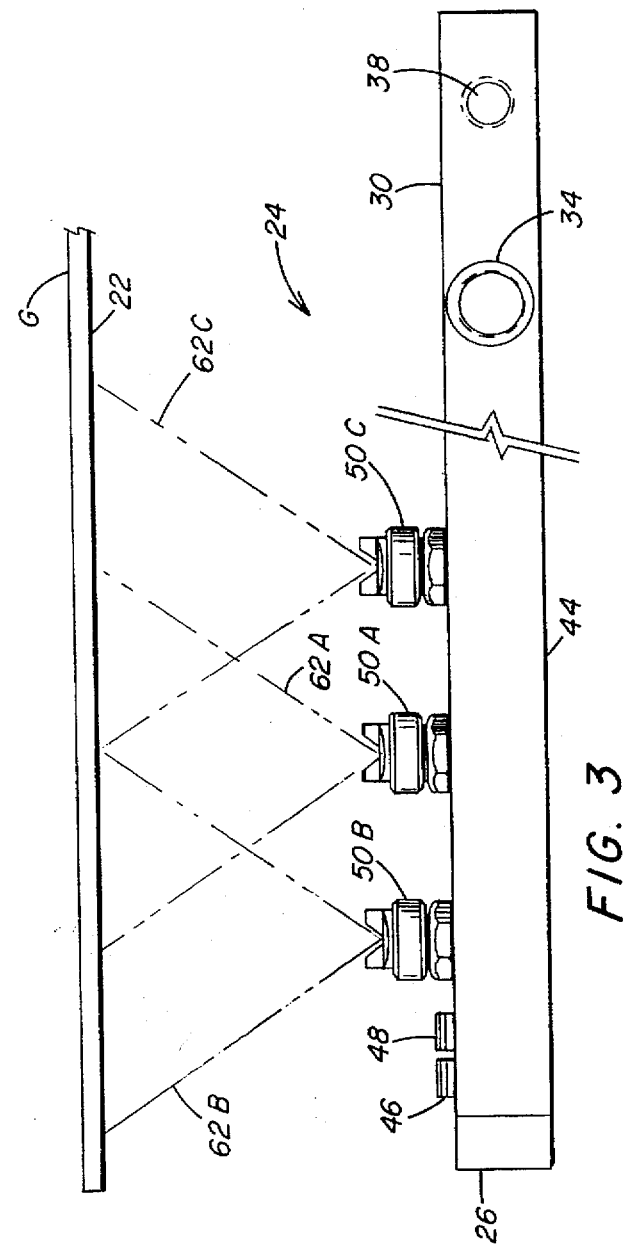
FIG. 2
FIG. 3

METHOD OF REDUCING GLASS SHEET MARKING

CROSS REFERENCE TO RELATED APPLICATIONS

This application is a Continuation-in-Part of U.S. patent application Ser. No. 08/316,163, filed on Sep. 30, 1994 now abandoned.

This invention relates to reducing bottom surface defects in glass sheets and, in particular, to reducing marks on the bottom surface of hot glass sheets which result from the glass being supported by conveyor rolls.

Continuous float glass processes conventionally entail depositing pulverulent batch materials into a pool of molten glass maintained within a tank type melting furnace and applying thermal energy until the materials are melted into a pool of molten glass. The molten glass is then deposited onto a bath of molten metal, typically tin, and formed into a glass ribbon of desired thickness. The glass ribbon exits the bath and is supported by conveyor rolls, generally stainless steel, chrome plated or ceramic. To protect the glass surface, $SO_2$ gas may be delivered through a perforated pipe to the bottom surface of the glass ribbon as it exits the bath to act as a lubricant and protect the glass surface. It is believed that the $SO_2$ gas oxidizes to form $SO_3$ which reacts with free alkali at the glass surface to form sodium sulfate to reduce friction and roll marking. However, the efficiency of converting the $SO_2$ to $SO_3$ to $Na_2SO_4$ is very low, generally less than 1% at temperature ranging from 1100°–1200° F. (593°–649° C.) which is typical of the glass temperature at the lift-out end of the float bath. In addition, excess $SO_2$ gas and sulfur by-products, such as sulfuric acid and pyrosulfates, cause equipment corrosion and material build-up on the rolls, which, in turn, causes other defects on the bottom of the glass surface such as roll marking.

$SO_2$ gas is also used to reduce marking of a glass sheet in a glass sheet tempering or bending operation. More particularly, glass sheets are conveyed over a series of conveying rolls through a furnace to heat the sheets to a temperature of about 1200° F. $SO_2$ gas is delivered to the lower surface of the glass sheet within the furnace to form $SO_3$ which reacts with the lower surface to form sodium sulfate. The sodium sulfate "conditions" the rolls by building up a layer of sodium sulfate on their conveying surface to protect the glass sheets from marking. As with its use in a float glass operation, the use of $SO_2$ in a furnace may result in the corrosion of the $SO_2$ delivery system and equipment within the furnace.

It will be advantageous to protect the surface of a glass sheet in a manner that does not have the problems associated with $SO_2$ gas.

SUMMARY OF THE INVENTION

The present invention discloses a method of reducing marking of a heat softened glass sheet which results when portions of the sheet are contacted by glass sheet handling equipment. The portion of the sheet susceptible to marking is sprayed with an inert material having a melting point and decomposition temperature of at least 1200° F. to form a layer that protects the sheet portion against marking from the equipment. The inert material may include alkali material, alkaline earth material, metal salts, acetates, nitrates, phosphates, borates, ammonium salts, refractory material of colloidal dimension, and combinations thereof. The inert material may be combined with a fluid carrier and sprayed on the sheet. In one particular embodiment of the invention, the lower surface of a glass sheet is sprayed with an aqueous solution of sodium sulfate to form a protective layer of sodium sulfate and protect the surface against marking. The spray may be applied to the glass while the glass is at an ambient temperature or an elevated temperature. In the instance where the fluid carrier is a liquid carrier, the coating material and carrier may be applied to the glass sheet while the glass is at a temperature that will vaporize the liquid carrier when applied, leaving a layer of the coating material on the glass sheet.

DESCRIPTION OF THE DRAWINGS

FIG. 2 is a plan view of a multiple nozzle spray arrangement used to apply sodium sulfate to the lower surface of a glass sheet as disclosed in the present invention, with portions removed for clarity.

FIG. 3 is an elevational side view of the spray arrangement illustrated in FIG. 2.

DETAILED DESCRIPTION OF THE INVENTION

The invention is presented herein in combination with the hot end of a continuous float glass operation and with a glass sheet heating arrangement, but it should be appreciated that the present invention may be used in any operation where it is desired to prevent marking and sticking of hot glass sheets by rolls or other glass contacting equipment.

Figure 1:
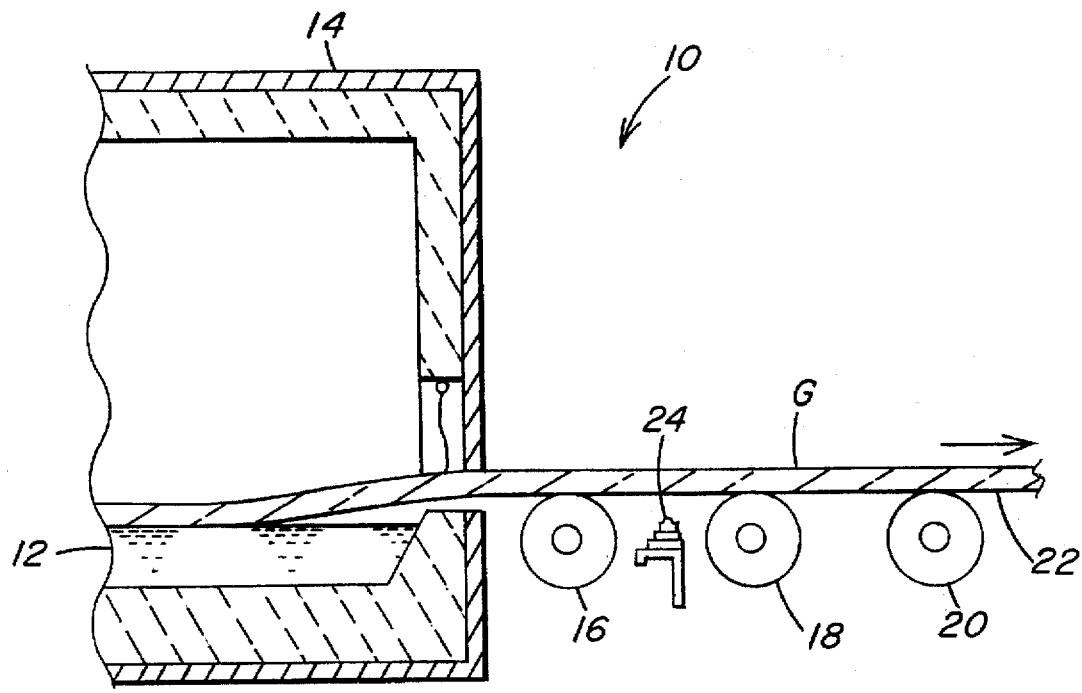
FIG. 1 is a schematic cross-sectional view of the hot end of a conventional continuous float glass operation.

FIG. 1 illustrates the hot end 10 of a continuous float glass operation. Batch materials are combined and continuously melted and refined upstream of the hot end 10 in one or more vessels to form molten glass in any conventional manner well known to those skilled in the art. The molten glass is then deposited onto molten tin 12 in a bath section 14 where a glass ribbon G is formed. The ribbon G is removed from the bath 14 by lift-out rolls 16, 18 and 20 and conveyed into an annealing lehr and cooling section (not shown) where the glass G is controllably cooled from about 1100°–1200° F. (593°–649° C.) as it exits the bath 14 to ambient temperature.

In the present invention, it is desired to coat the bottom surface 22 of the hot glass ribbon G with the material that will protect the surface from roll marking and other defects. The material should have a high melting point so that it will not melt and permanently stick to the glass surface and/or conveying rolls, or high decomposition temperature so that it will not decompose and form undesired by-products, preferably greater than 1200° F. (649° C.). In addition, in a float glass manufacturing operation where it is desirable to maintain a pristine glass surface, the coating material should not permanently change the glass surface by chemical reaction, i.e. it should be inert to the hot glass surface, nor should it change the surface by physical indentation. However, if it is permitted or even desired that the glass surface obscure a clear view through the glass, the material may react with the glass surface, as will be discussed later in more detail. Although it is contemplated that a dry material may be blown into a chamber through which the glass G travels to coat the glass, it is preferred that the material be combined with a fluid carrier, preferably a liquid carrier, and sprayed directly onto the glass surface 22 to better control material application. As used herein, the term "solution" will be used to refer to the combination of the coating material with a liquid carrier; however, it should be appreciated that depending on the inert coating material used, its combination with the carrier may form a solution, suspension or colloid dispersion. In one embodiment, the material is an aqueous solution of inorganic compounds, preferably alkali and/or alkaline earth materials or other metal salts, sprayed onto the lower hot glass surface. By spraying the coating material directly on the hot glass surface, the liquid carrier, and in particular the water, will vaporize when it contacts the hot glass surface, leaving a layer of protective material having a solid, inert structure on the glass surface that is easily removable by washing. Although it is not required, it is preferred that liquid be applied on the sheet as a mist. Such an application will provide a more uniform spray coverage, faster evaporation of the carrier and require less liquid to be sprayed. It is also preferred that the solution be pH neutral, i.e. have a pH from 6 to 8, to avoid the need for special handling and materials of construction for both the application and, if required, subsequent removal of the sprayed material. In a preferred embodiment of the present invention, the material is a pH neutral, aqueous solution of sodium sulfate ($Na_2SO_4$).

To apply the sodium sulfate solution to the lower surface of the glass ribbon G as it exits the bath 14, it is contemplated that a spray manifold 24 be positioned between either the bath 14 and lift out roll 16 to coat the glass G immediately after it leaves the bath 14, or between a pair of lift-out rolls, e.g. rolls 16 and 18, as shown in FIG. 1. With this latter positioning, roll 16 acts as a barrier against diffusion of the spray back into the bath 14. Either of these arrangements will form a protective layer on the glass surface 22 while bypassing the requirement to oxidize $SO_2$ to form $SO_3$ and any subsequent reactive steps, as well as eliminate the formation of undesired by-products associated with the use of $SO_2$ gas. In addition, the formation of sodium sulfate layer on the glass surface 22 is now controllable and no longer effected by the glass composition. More particularly, the concentration of free alkali or presence of bottom surface scum containing calcium, magnesium, tin, iron sulfides or other contaminants which would interfere with the formation of $Na_2SO_4$ in a conventional $SO_2$ gas operation, would no longer be a factor in providing adequate coating of the glass.

Referring to FIGS. 2-5, manifold 24 is a low profile, multiple nozzle spray arrangement used to coat the hot glass surface. Because of the close proximity of the application point to the high temperature bath 14, the spray manifold 24 is cooled to prevent volatilization of the sodium sulfate solution prior to it being sprayed onto the glass. In the particular spray arrangement illustrated in FIG. 2, manifold 24 includes a bar member 26 with cooling conduit 28 extending from surface 30 through most of bar 26's thickness, and generally extending about the bar's periphery. Coolant inlet 32 and outlet 34 are connected to opposite ends of conduit 28. Bar 26 also includes a liquid conduit 36 and a gas conduit 40 positioned along surface 44 of bar 26. Inlets 38 and 42 are positioned at one end of conduits 36 and 40, respectively, to supply liquid and gas to the manifold 24. Plugs 46 and 48 are positioned at the other end of conduits 36 and 40, respectively, to assist in cleaning out these conduits and, if required, to provide additional supply lines to equalize pressure along these conduits. Although not required, coolant inlet 32, coolant outlet 34, liquid inlet 38 and gas inlet 42 are positioned along the lateral sides of the bar 26 as shown in FIG. 2. Conduits 36 and 40 generally parallel each other and extend the length of bar 26 between portions of coolant conduit 28. Nozzles 50 (shown in FIGS. 3 and 4) are secured to bar 26 at predetermined spacings. An aqueous solution of sodium sulfate is supplied from conduit 36 to nozzles 50 through ports 52 and pressurized gas is supplied from conduit 40 to nozzles 50 through ports 54. Plate 56 (shown in FIGS. 2 and 5) seals conduit 28 and plates 58 and 60 (shown in FIGS. 2 and 5) seal conduits 36 and 40, respectively.

In applying the aqueous solution of sodium sulfate, it is preferred to space the nozzles along bar 26 and position the nozzles 50 relative to the glass surface 22 such that there is an overlap of the area sprayed by the nozzles to ensure adequate coverage. It is preferred that the overlap include at least 75% of the spray area and, more preferably, 100% of the spray area. More particularly, referring to FIG. 3, one-half of the spray distribution 62A of nozzle 50A is overlapped by half of the spray distribution 62B of nozzle 50B and the other half of distribution 62A is overlapped by half of the spray distribution 62C of nozzle 50C.

Figure 4:
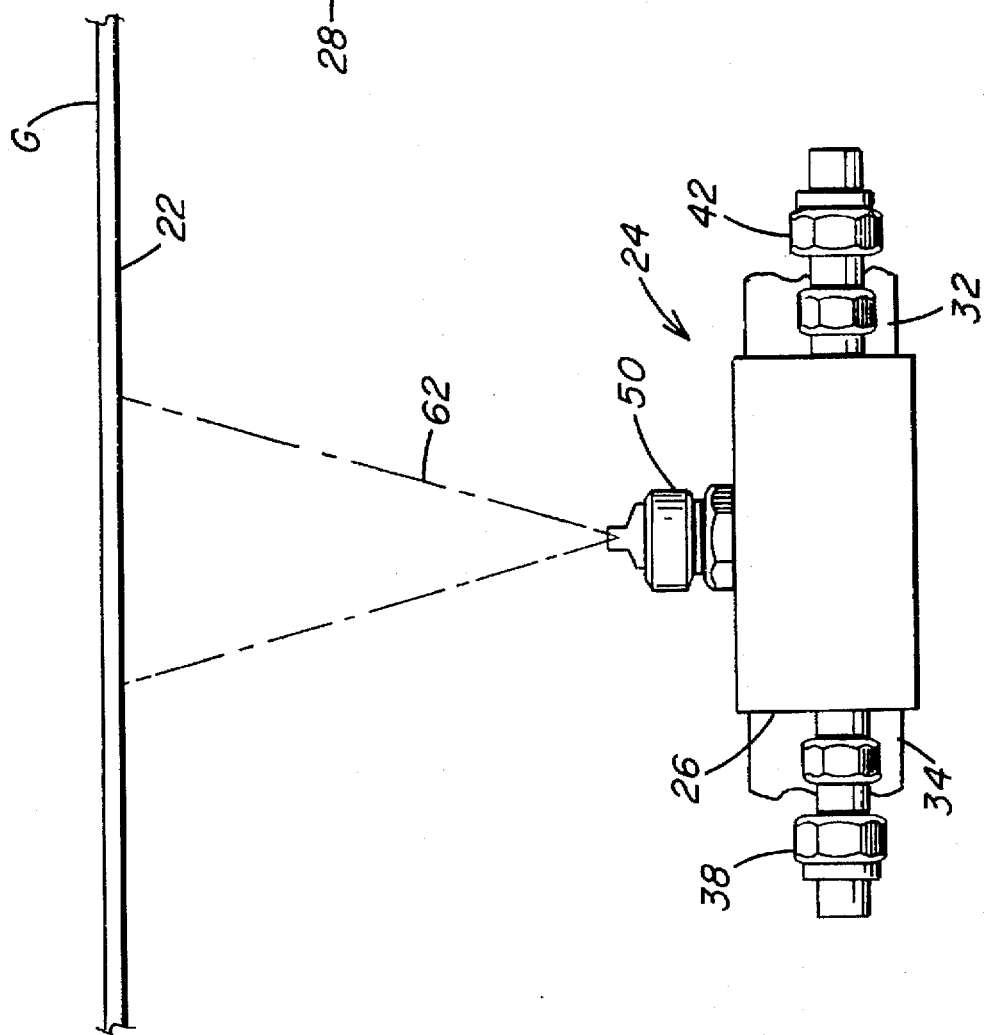
FIG. 4 is an end view of the spray arrangement shown in FIG. 2.

In the particular embodiment of the invention illustrated in FIGS. 3 and 4, the spray is directed in a narrow, concentrated area to reduce excess spray. More particularly, the spray distribution is wider in the elevational view of FIG. 3 than in the end view of FIG. 4. This may be accomplished by selecting a nozzle 50 that concentrates the spray of aqueous solution along a narrow band rather than a conventional conical distribution.

During testing of the present invention on 5 mm thick float glass, a spray manifold 24 was positioned on existing support brackets between lift-out rolls 16 and 18 at the hot end 10 of a continuous float glass operation. Due to the existing support arrangement, the manifold 24 spacing below the glass ribbon G varied from 2-3 inches (5.08-7.62 cm); however, it was found that this variation did not adversely affect the effectiveness of the application of the sodium sulfate solution. The tested nozzles 50, which were spaced at 2 inch (5.08 cm) centers, were air atomizer, flat spray nozzles, although it should be appreciated that other types of nozzles may be used. One nozzle tested was an external mix nozzle available from Spraying Systems Company, Ill., type no. SUE 18B. The other nozzle tested was an internal mix, hybrid nozzle with a type no. SUE 18B fluid cap and a type no. SUE 13A air cap. With this particular brand of nozzles, referring to FIG. 5, the ports 52 direct the aqueous solution of sodium sulfate into chambers 64 (only one shown in FIG. 5), each of which receives a nozzle 50 (not shown in FIG. 4). In addition, ports 54 direct the atomizing gas into a circular groove 66 (shown in FIGS. 2 and 5) around each chamber 64 (shown in FIG. 5) along surface 44 to better distribute the atomizing gas to this particular nozzle 50 configuration.

In the particular embodiment of the invention discussed above, nitrogen was used as the atomizing gas because of the close proximity of the spray manifold 24 to the exit end of the bath 14 and the need to prevent an oxidizing gas from combining with the reducing atmosphere in the float bath 14. More specifically, if another gas, such as air or oxygen, was used in place of the nitrogen in this environment, it is believed that the oxygen would diffuse into the tin bath forming tin oxides and iron oxides on the molten tin 12 surface. Portions of these oxides will diffuse into and/or react with the glass surface leaving deposits which will adversely affect the surface quality of the glass. These deposits may also be transferred to the lift-out rolls, resulting in additional marking of the glass. It should be appreciated that under other conditions where reaction of the atomizing gas is not a factor, other gases may be used.

An aqueous solution ranging from 0.01 to 1.5 weight percent sodium sulfate with a pH of about 7 was sprayed onto the lower surface of a glass ribbon G having a surface temperature between 1100°–1200° F. (593°–649° C.). The application rate of the aqueous sodium sulfate was approximately 1–2.5 cc of liquid per square foot (10.76–26.9 cc/m$^2$) of glass with the glass being conveyed at a rate of 295–344 inches (7.49–8.74 m) per minute. The nitrogen gas was supplied to the manifold 24 at a rate of approximately 20–40 SCFM (566–1133 liters/min).

Presuming that the density of the sodium sulfate solution is about equal to that of water, it was observed that when there was light roll marking on the glass surface prior to spraying, at a nominal delivery rate of at least 1.0 mg Na$_2$SO$_4$/ft$^2$, there was minimal or no roll marking after cleaning the glass. It is believed that a nominal delivery rate as low as 0.5 mg Na$_2$SO$_4$/ft$^2$ should minimize roll marking. It was noted that a nominal delivery rate of 15 mg/ft$^2$, a white coating was formed on the lift out rolls. It is believed that this condition is due to the aqueous solution vaporizing before it reached the glass and the resulting sodium sulfate powder diffusing throughout the hot end 10. However, the white layer of dried powder rubbed off easily indicating that no caking or sticky sulfate by-products which may be formed when using SO$_2$ gas, were deposited during operation.

In a float glass forming operation, as the glass G is coated with the sodium sulfate spray, a portion of this coating will be transferred to the lift out rolls. As the sodium sulfate builds up on these rolls, it is believed that the amount of sodium sulfate needed on the glass surface may be reduced. As a result, it should be appreciated that the performance of the sodium sulfate spray of the present invention in reducing roll marking depends in part on the condition of the lift out rolls which in turn affects the amount of roll marking. More particularly, for example, if the surface of the rolls are coated with material that may mark the glass, in order to quickly reduce any marking problem from the rolls, the delivery rate should be increased to levels greater than that discussed above. Prior to one test, the lower surface 22 of the glass ribbon G was not being treated with any material. When the aqueous solution of sodium sulfate was sprayed onto surface 22 by manifold 24, it was observed that a nominal delivery rate of at least 5 mg Na$_2$SO$_4$/ft$^2$ reduced roll marking to a "no reject" level within 2 hours. After the rolls are "conditioned," i.e. coated, with the sodium sulfate, the nominal delivery rate may be reduced to a maintenance level which as discussed above, may be as low as 0.5 mg Na$_2$SO$_4$/ft$^2$ and preferably at least 1 mg Na$_2$SO$_4$/ft$^2$.

In light of the fact that the coated glass sheet will deposit Na$_2$SO$_4$ on the surface of the conveyor roll, as an alternative to spraying the lower surface of the hot glass sheet, it should be appreciated that the roll surface may be sprayed directly with the aqueous solution of sodium sulfate to reduce roll marking. More particularly, by spraying the roll surface with sodium sulfate, the layer will build up on the roll surface to protect the glass against roll marking. In addition, a portion of the sodium sulfate may be redeposited on the glass surface and afford further protection against subsequent marking.

As discussed above, the testing was done on 5 mm thick float glass. It is believed that the desired sodium sulfate delivery rate required to control roll marking may vary directly with the thickness of the glass, i.e. the heavier the glass, the greater the nominal delivery rate. As a result, it is believed that a nominal delivery rate of at least 0.1 mg Na$_2$SO$_4$/ft$^2$ per millimeter of glass thickness, and preferably at least 0.2 mg Na$_2$SO$_4$/ft$^2$ per millimeter of glass thickness, is required to control roll marking. In addition, it is believed that a nominal delivery rate of at least 1 mg Na$_2$SO$_4$/ft$^2$ per millimeter of glass thickness may be used to quickly eliminate roll marking and condition the conveyor rolls in a hot glass sheet handling operation where marking is a concern. It should be appreciated that a lower delivery rate may be used but it will take additional time to eliminate the initial marking condition. Furthermore, a greater delivery rate may reduce this amount of time; however excessive spraying may lead to excessive buildup of sodium sulfate on the rolls and the glass surface, which in turn may affect subsequent processing of the glass as will be discussed later.

It should be appreciated that although the present invention is presented in combination with a spray arrangement having a specific nozzle configuration and spacing and a predetermined distance from the glass to the nozzles, other nozzle configurations, nozzle spacings and/or distances from the nozzles to the glass surface may be used. More particularly, the nozzle spacing and distance from the glass may be increased provided that a higher spray velocity is used to apply the sodium sulfate solution. If the spray velocity is too low and/or the spray has too great of a distance to travel before impacting the glass surface, the water may evaporate prematurely, leaving a dusting of sodium sulfate in the area beneath the glass rather than depositing the sodium sulfate directly on the glass surface.

It should be further appreciated that other low profile spray configurations may be used to supply an aqueous solution of sodium sulfate and an atomizing gas to the nozzles 50 and to circulate coolant through the nozzle manifold. In addition, airless spray technology, which will spray the liquid without an atomizing gas in a manner known in the art, may be used as the application technique.

Although it is preferred to apply the sodium sulfate via a liquid spray, it is contemplated that dry powder technology, e.g. as disclosed in U.S. Pat. Nos. 4,344,986 and 4,753,191 to Henery, may be used to control and direct the application of sodium sulfate powder directly on the glass surface. More particularly, the sodium sulfate powder may be combined with a carrier gas stream and delivered to the glass surface through a nozzle arrangement positioned close to the surface.

Sodium sulfate is the preferred material; however other water-soluble alkali or alkaline earth materials, such as acetates, nitrates, chlorides, phosphates and borates, or other inorganic compounds, such as ammonium salts, may be used if its melting or decomposition temperature is higher than that of the glass temperature at the point of application. In addition, the present invention also contemplates that refractory material of colloidal dimensions, typically in the range of 1–100 nanometers, acting as a high temperature parting medium, for example, colloidal alumina, silica, titania and zirconia, may also be sprayed onto the hot glass surface as taught herein to reduce roll marking and protect the glass surface. As discussed earlier, if the pristine surface quality of the glass is to be maintained, the sprayed material should also be inert with respect to the glass surface. However, if this is not a factor, materials that react with the glass may be used. More particularly, it is believed that chlorides and colloidal alumina will react with the glass leaving a haze on the surface that cannot be removed by washing.

The invention as presented above uses an aqueous solution of sodium sulfate to spray the lower surface 22 of hot glass ribbon G after forming. However, it should be appreciated that the present invention contemplates the use of the coating materials discussed herein in other hot glass sheet handling and fabricating operations, provided the material has a melting or decomposition temperature greater than the temperature to which the glass sheet will be heated. For example, in a glass sheet heat operation such as shaping and/or tempering, flat glass sheets are conveyed over flat conveyor rolls and heated to a temperature, typically between about 1050°–1200° F. (566°–649° C.) prior to a shaping and/or controlled cooling operation. In these types of operations, the inert coating material as taught herein, and in particular an aqueous solution of sodium sulfate, may be applied to the lower surface of the glass sheet during its heating to prevent marking of the glass sheet by conveyor rolls in the furnace and/or glass sheet shaping station. The coating may also protect against marking from the glass sheet engaging surface of a lower shaping mold and application of the coating material on the upper surface of the hot glass sheet may reduce marking from a glass sheet shaping surface of an upper shaping mold during a sheet pressing operation. In addition, the coating material may be applied directly on surfaces of glass sheet handling equipment which may come in contact with the hot glass sheet in order to eliminate potential roll or equipment marking.

Figure 6:
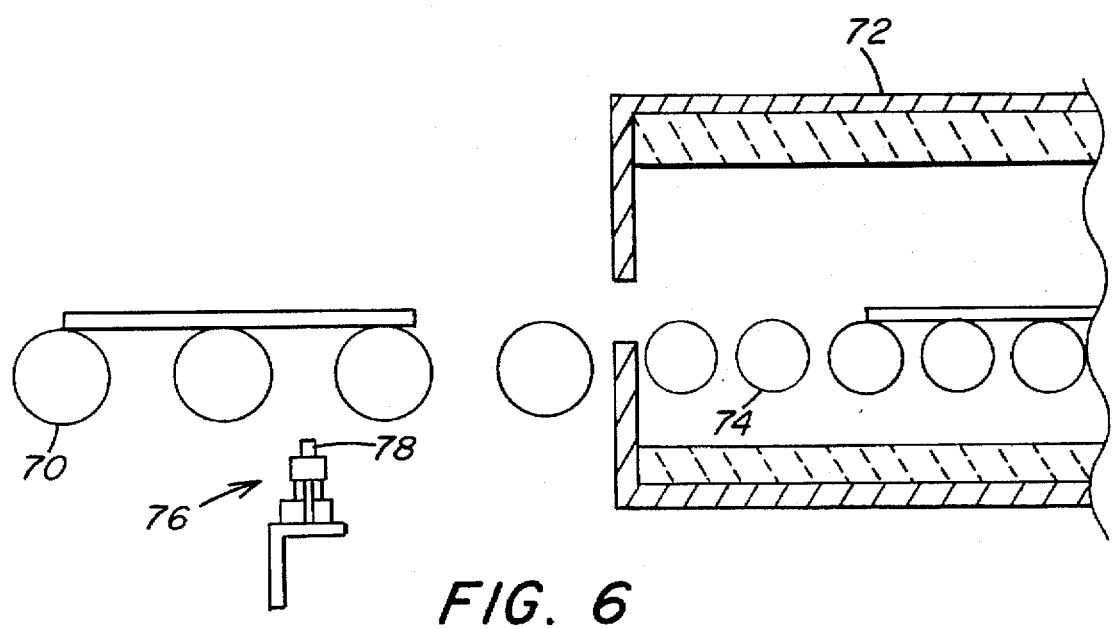
FIG. 6 is a schematic elevational of the loading end of a glass sheet heating arrangement incorporating the teachings of the present invention.
Figure 5:
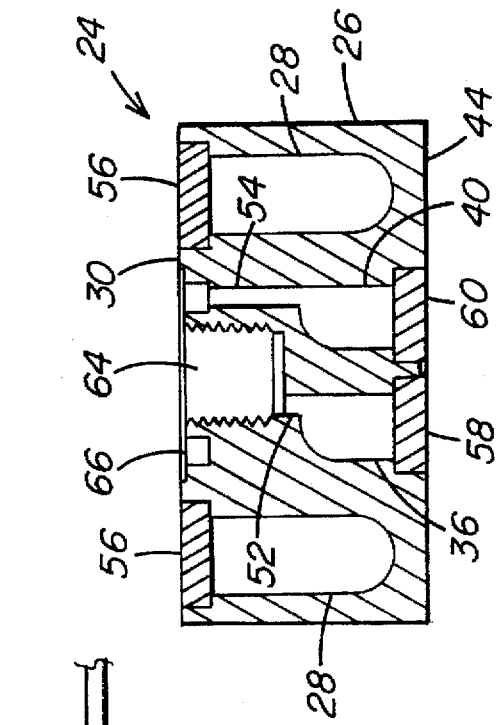
FIG. 5 is a cross-sectional view taken along line 5—5 of FIG. 2.

If desired, the coating material as taught herein, and in particular an aqueous solution of sodium sulfate, may be applied to the glass surface prior to heating the glass so that rather than vaporize the carrier as it contacts the hot glass surface, the carrier is evaporated more slowly as the sheet enters the furnace and is heated. More specifically, referring to FIG. 6, a sheet heating operation for both heat treatment or subsequent shaping typically includes a plurality of run-in conveyor rolls 70 which convey the glass sheet G into a furnace 72. Furnace rolls 74 convey the sheet G through the furnace 72 as it is heated to a desired elevated temperature, as discussed earlier. A spray manifold 76 is positioned outside of the furnace 72, e.g. at the entry end of the furnace 72 or between two of the rolls 70 as shown in FIG. 6, so that the glass sheet G may be sprayed before entering the furnace 72, i.e. is while the sheet is at an ambient temperature. After the sprayed sheet G enters the furnace 72, the water evaporates leaving the sheet coated with a layer of sodium sulfate. This arrangement has the advantage of being able to use a manifold 76 that does not require cooling, as discussed earlier, since the manifold 76 is positioned outside the furnace 72.

In the particular embodiment of the invention, rolls 70 were placed at 5.5 inch (14 cm) centers and an uncooled manifold 76 was positioned between a pair of rolls 70. The manifold 76 included 10 spray assemblies 78 spaced at 2 inch (5.1 cm) centers, each having a ¼ JBC nozzle body and an external mixed type number SUE 18B nozzle cap, both available from Spraying Systems Company, Ill. The operation of this type of nozzle cap was discussed earlier. The manifold 76 was positioned below the roll 70 so that it was approximately 8 inches (20.3 cm) from the nozzle cap to the bottom of the glass sheet G. This spacing of the nozzles both along the manifold 76 and the glass sheet G was sufficient to provide overlap between the sprayed areas and ensure adequate covering of the glass surface, as discussed earlier.

An aqueous solution of 0.5 and 1.0 weight percent sodium sulfate having a pH of approximately 7 was sprayed onto the lower surface of 3.9–4.1 mm thick glass sheets. Since the solution was applied outside the furnace 72, the glass was at an ambient temperature of about 60°–80° F. (16°–27° C.). The application rate of the sodium sulfate solution was approximately 0.1–0.4 cc of liquid per square foot (1.08–4.30 cc per meter square) of glass with the glass being conveyed at a rate of 200–260 inches per minute (5.1–6.6 meters per minute). Air, which was used as the atomizing gas, was supplied to manifold 76 at a rate of approximately 2–3 psi (1.38–2.07 newtons/cm$^2$). With this spraying arrangement, it was found that the water evaporated within 5 feet (1.52 m) after entering the furnace 72 which at its entry end was approximately 800°–1000° F. (427°–538° C.). The sodium sulfate solution was sprayed at a rate ranging from 0.5 to 4.3 mg of sodium sulfate per square foot of glass.

During testing, it was observed that the roll marking tended to be concentrated along the marginal edge portions of the glass sheet. It is believed that this may be due to the tendency of the glass to bow upward during heating and, therefore, support most of its weight in these areas. From a starting condition where unconditioned rolls were marking the glass sheets during a heating operation, it was observed that an aqueous solution of sodium sulfate delivered at a nominal rate of 0.5 to 1.0 mg of sodium sulfate per square foot of glass eliminated roll mark in 30 to 60 minutes, depending on the severity of the marking. It should be appreciated that lower delivery rates may be used to eliminate roll marking; however, it is expected that decreasing the delivery rate will increase the time it will take to move from a roll marking to no marking condition. It is further believed that a delivery rate of at least about 0.2 mg per square foot would produce an adequate maintenance level of coating for glass sheets to maintain elimination of roll marking once the conveyor rolls have been conditioned.

As discussed earlier, the glass sheet G shown in FIG. 6 was sprayed while at an ambient temperature; however, it should be appreciated that the sheet G may be sprayed at higher temperatures. For example, the sheets could be sprayed while within the furnace 72 or the sheet may be delivered to the furnace 72 at an elevated temperature as the result of some earlier processing step.

It is further contemplated that the coating may be applied at a location removed from the entry end of the furnace and, in the case where a coating solution is applied, the glass may be air dried. However, it should be appreciated that the more handling there is of the glass after the coating is applied, the greater the possibility that some of the protective coating may drop or rub off.

When using the present invention, care must be taken to avoid spraying too much solution on the glass sheet. If there is an excessive amount of spraying, water may build up on the rolls, forming droplets which, in turn, may be transferred from the rolls to the glass as it is conveyed thereover. The water on the glass may pick up contaminants on the surfaces of other rolls and, as the water evaporates, leave debris on the glass that may form defects. In addition, if there is excessive overspray of the glass, i.e. spray that passes between successive sheets and/or about the perimeter of the sheets, which fall back on the upper surface, the water will collect on the upper surface and form waterspots. Overspray is also a problem when the glass sheet includes a ceramic paint band on its upper surface which is to be dried and cured during the heating operation. It was observed that water droplets from the mist which fell on the wet paint band left defects in the paint surface. This condition may be improved by providing a spray hood above the spray area to remove the overspray.

As discussed earlier, as an alternative to spraying the glass sheets to apply the aqueous sodium sulfate solution, marking may be reduced by applying the solution directly to the conveying rolls. It should be appreciated that where the glass is coated at ambient or low temperatures, i.e. a temperature at which the coating solution will not vaporize when initially deposited on the glass surface, application techniques other than spraying may be used to apply this solution to the roll surface. For example, the rolls may be positioned in a trough containing the coating solution such that the lower portion of the roll is submerged within the solution. Another alternative is to use a pad or belt that is wetted with the solution to contact the rotating roll and coat the roll surface.

As presented herein, water is the preferred carrier for the coating material but it should be appreciated that other fluid carriers, both gas and liquid, may be used. The type of application equipment, the temperature of the glass and the environment within which the coating material is applied may impact the type of carrier used. It is preferred that the carrier be non-flammable, to avoid being safety hazard, and further that it not decompose at higher temperatures.

The invention described and illustrated herein represents a description of illustrative preferred embodiments thereof. It is understood that various changes may be made without departing from the gist of the invention defined in the claims set to follow.

We claim:

1. A method of reducing marking of a hot glass ribbon, wherein said ribbon is contacted and marked by glass ribbon handling equipment, comprising the steps of:

dissolving sodium sulfate in water to form an aqueous solution;

forming a hot glass ribbon in a float bath of a glass melting furnace;

transferring said ribbon along a series of lift out rolls which support and contact a lower major surface of said ribbon, wherein said glass ribbon is at a temperature of at least about 1100° F.;

spraying said lower major surface of said glass ribbon with said aqueous solution prior to said ribbon contracting selected ones of said lift out rolls, wherein said water vaporizes on contact with said hot glass ribbon leaving a water soluble protective layer of sodium sulfate along said lower major surface to reduce marking of said lower surface by said conveyor rolls, wherein said sodium sulfate layer is inert with respect to said glass ribbon; and controllably cooling said ribbon.

2. The method as in claim 1 wherein said spraying step further includes the step of combining said solution with an atomizing gas.

3. The method as in claim 1 wherein said spraying step includes the step of spraying said aqueous solution of sodium sulfate at a nominal delivery rate of at least about 0.2 milligrams of sodium sulfate per square foot of glass ribbon per millimeter of thickness of said glass ribbon.

4. The method as in claim 1 wherein said spraying step includes the step of spraying said aqueous solution at a nominal delivery rate of at least about 1 milligram of sodium sulfate per square foot per millimeter of thickness of said glass ribbon for a sufficient time to allow a portion of said protective sodium sulfate layer to be transferred from said glass ribbon to a glass ribbon surface of said conveyor rolls and subsequently reducing said nominal delivery rate to at least about 0.2 milligram sodium sulfate per square foot per millimeter of thickness of said ribbon.

5. The method as in claim 1 wherein said spraying step includes the step of spraying said aqueous solution of sodium sulfate at a nominal delivery rate of at least about 0.1 milligrams of sodium sulfate per square foot of glass ribbon per millimeter of thickness of said ribbon to form said protective layer of sodium sulfate.

6. The method as in claim 1 wherein said spraying step includes the step of applying said aqueous solution of sodium sulfate as a mist.

7. The method as in claim 1 further including the step of removing said protective layer from said ribbon surface.

8. A method of reducing marking of a glass sheet wherein said sheet is contacted and marked by glass sheet conveying rolls, comprising the steps of:

dissolving sodium sulfate in water to form an aqueous solution;

transporting a glass sheet over a series of conveyor rolls which support and contact a lower major surface of said sheet;

coating said lower major surface of said sheet with said aqueous solution; and heating said sheet to evaporate said water from said sheet to leave a water soluble protective layer of sodium sulfate along said lower major surface of said glass sheet to reduce marking of said lower major surface by said conveyor rolls, wherein said sodium sulfate layer is inert with respect to said glass sheet;

continuing to heat said sheet to its heat softening temperature;

forming said sheet to a desired curved configuration; and controllably cooling said sheet.

9. The method as in claim 8 further including the step of washing said protective layer off said sheet surface.

10. The method as in claim 8 wherein said coating step includes the step of spraying said lower major surface of said sheet with an aqueous solution of sodium sulfate at a nominal delivery rate of at least about 0.5 milligrams of sodium sulfate per square foot of glass sheet.

11. The method as in claim 8 wherein an upper shaping mold having a glass sheet engaging surface contacts and marks selected portions of an upper major surface of said glass sheet and said coating step includes the step of coating said upper major surface of said glass sheet with said aqueous solution of sodium sulfate, wherein water in said aqueous solution evaporates during said heating step and leaves an additional water soluble protective layer of sodium sulfate along said upper major surface of said sheet to reduce marking by said upper mold.

12. A method of reducing marking of a glass sheet wherein said sheet is contacted and marked by glass sheet conveying rolls, comprising the steps of:

dissolving sodium sulfate in water to form an aqueous solution;

transporting a glass sheet over a series of conveyor rolls which support and contact a lower major surface of said sheet;

heating said sheet to a temperature sufficient to vaporize said water;

spraying said lower major surface of said sheet with said aqueous solution so as to vaporize said water on contact with said heated sheet and leave a water soluble protective layer of sodium sulfate along said lower major surface of said sheet to reduce marking of said lower major surface by said conveyor rolls, wherein said sodium sulfate layer is inert with respect to said glass sheet;

continuing to heat said sheet to its heat softening temperature;

forming said sheet to a desired curved configuration; and controllably cooling said sheet.

13. The method as in claim 12 wherein an upper shaping mold having a glass sheet engaging surface contacts and marks selected portions of an upper major surface of said glass sheet and said spraying step includes the step of spraying said upper major surface of said glass sheet with said aqueous solution of sodium sulfate, wherein said water vaporizes on contact with said heated glass sheet and leaves an additional water soluble protective layer of sodium sulfate along said upper major surface of said sheet to reduce marking by said upper mold.

14. The method as in claim 12 wherein said spraying step includes the step of spraying said lower major surface with an aqueous solution of sodium sulfate at a nominal delivery rate of at least about 0.5 milligrams of sodium sulfate per square foot of glass sheet.

15. The method as in claim 14 further including the steps of continuing said spraying step for a sufficient time to allow a portion of said protective layer to be transferred from said lower surface of said glass sheet to a glass sheet conveying surface of said conveyor rolls and subsequently reducing said nominal delivery rate to at least about 0.1 milligram of sodium sulfate per square foot of glass sheet.

16. The method as in claim 12 further including the step of washing said protective layer off said sheet surface.

17. A method of reducing marking of a glass sheet wherein said sheet is contacted and marked by glass sheet conveying rolls, comprising the steps of:

dissolving sodium sulfate in water to form an aqueous solution;

transporting a sheet over a series of conveyor rolls which support and contact a lower major surface of said sheet;

coating said conveyor rolls said aqueous solution;

heating said glass sheet and conveyor rolls during at least a portion of said transporting step; and evaporating water in said aqueous solution from said conveyor rolls to form a water soluble protective layer of sodium sulfate on said conveyor rolls to reduce marking of said lower surface, wherein said sodium sulfate layer is inert with respect to said glass sheet.

* * * * *